United States Patent [19]
Okuta et al.

[11] Patent Number: 5,410,626
[45] Date of Patent: Apr. 25, 1995

[54] OPTICAL COUPLER HAVING A TAPERED FUSED REGION

[75] Inventors: Michitaka Okuta; Tetsuya Suga, both of Tokyo; Akio Tsugawa; Kiyohiko Kuramoto, both of Kitami, all of Japan

[73] Assignee: Kyocera Corporation, Kyoto, Japan

[21] Appl. No.: 81,479

[22] Filed: Jun. 23, 1993

[30] Foreign Application Priority Data

Jun. 25, 1992 [JP] Japan .................. 4-191519
Jun. 30, 1992 [JP] Japan .................. 4-195913
Aug. 4, 1992 [JP] Japan .................. 4-207790

[51] Int. Cl.$^6$ .................. G02B 6/00; G02B 6/26
[52] U.S. Cl. .................. 385/43; 385/39
[58] Field of Search .................. 385/39, 43; 65/1, 2, 65/3.11, 4.1, 4.2, 36

[56] References Cited

U.S. PATENT DOCUMENTS

| | | | |
|---|---|---|---|
| 4,392,712 | 7/1983 | Ozeki | 350/96 |
| 4,449,781 | 5/1984 | Lightstone et al. | 385/43 |
| 4,586,784 | 5/1986 | Tremblay et al. | 350/96 |
| 4,798,436 | 1/1989 | Mortimore | 350/96 |
| 4,798,438 | 1/1989 | Moore et al. | 385/43 |
| 4,822,126 | 4/1989 | Sweeny et al. | 350/96 |

FOREIGN PATENT DOCUMENTS

63-316007 12/1988 Japan .

*Primary Examiner*—Akm E. Ullah
*Attorney, Agent, or Firm*—Spensley Horn Jubas & Lubitz

[57] ABSTRACT

An optical coupler having a tapered fused region produced by locally heating the periphery of a plurality of aligned optical fibers, each having a core and a cladding, so that the optical fibers fuse together at the heated part, and then drawing the resulting fused region by pulling. The length of the fused region is not longer than 10 mm. The tapered fused region may be provided in such a manner that a plurality of optical fibers are disposed to intersect each other at a predetermined angle, and the intersecting portions are locally heated so as to fuse together and then subjected to pulling. The tapered fused region may be provided at each of two or more positions. Also disclosed is an optical coupler wherein at least one of a plurality of optical fibers each having a core and a cladding is previously heat-treated at a high temperature to enlarge the core in a portion thereof, and the enlarged-core portion of this optical fiber is fused to the other optical fibers and then subjected to pulling, thereby forming a tapered fused region.

5 Claims, 7 Drawing Sheets

| EXAMPLE OF MEASUREMENT | | | |
|---|---|---|---|
| SAMPLE NO. | a | b | c |
| 1 | 125 | 98 | 970 |
| 2 | 125 | 99 | 931 |

OPTICAL FIBER OF PRESENT INVENTION

FIG. 12(BB)

ORDINARY OPTICAL FIBER

OPTICAL COUPLER HAVING A TAPERED FUSED REGION

BACKGROUND OF THE INVENTION

The present invention relates to optical fiber couplers used in optical telecommunication networks to effect splitting/combining or multiplexing/demultiplexing of transmitted light.

A typical optical coupler of this type has heretofore been produced by locally heating a plurality of aligned optical fibers, each having only a core and a cladding with the coating peeled therefrom, with a gas burner or other heat source so that the optical fibers are fused together, and then properly pulling the fused region of the optical fibers.

More specifically, the flame of a gas burner is applied to a predetermined part of a plurality of optical fibers held in alignment with each other, and in this state the gas burner is swung all around the predetermined part to heat it, thereby fusing together the optical fibers. Then, the fused region of the optical fibers is drawn by pulling both ends of the fused region away from each other until a necessary coupling ratio is obtained, thereby forming a tapered fused region.

In the fused region, the diameter of the core of each optical fiber, which serves as an optical waveguide, decreases, and the mode field diameter of light propagating increases. In addition, the distance between the cores decreases. Consequently, coupling occurs between the cores. In other words, sinusoidal periodical coupling of light propagating takes place. This may be expressed simply by a sinusoidal function by a mode coupling equation.

The above-described optical coupler suffers, however, from the following problems:

① When the optical coupler is produced as described above, the tapered fused region increases in length. Consequently, the central portion of the fused region has an approximately straight-line form. In this case, a coupling ratio close to that of complete coupling can be obtained.

The complete coupling between optical fibers is essential characteristics for a wavelength-division multiplexer/demultiplexer, but it is a drawback to ordinary optical couplers because the coupling ratio changes with wavelength fluctuation. Therefore, this type of optical coupler has heretofore been impossible to use in wavelength-division multiplexing.

In the meantime, there is another type of optical coupler having reduced wavelength dependence, in which the coupling ratio changes only slightly with wavelength fluctuation. This optical coupler is produced as follows: In advance of the fusing process, one optical fiber alone is pulled (pre-pulling). Then, this optical fiber and another optical fiber (not subjected to pre-pulling) are held in alignment with each other, fused together, and subjected to pulling. This optical coupler makes use of the nature that the two optical fibers are different from each other in propagation constant because of the difference in the core diameter and hence incomplete coupling is realized between the optical fibers to achieve reduced wavelength dependence. However, this optical coupler needs the pre-pulling process. In addition, it involves the problem that the strength deteriorates partly because one optical fiber is heated twice and partly because the resulting fused region is smaller in diameter than the fused regions of the ordinary optical couplers.

There are other methods for reducing the wavelength dependence of optical couplers: one in which optical fibers which are varied in refractive index or other properties are coupled together, and another in which optical fibers which have different core diameters are coupled together. However, either of the methods suffers from the problem that since the optical fibers fused together are different in characteristics, when they are connected to other optical elements, mismatch occurs.

② Optical fibers that have a small core diameter in comparison to the cladding diameter as in the case of single-mode fibers need to increase the length of the fused region in order to attain the core diameter and intercore distance required to initiate coupling, resulting in a reduction in the diameter of the tapered fused region. If the fused region becomes long in length and small in diameter, the strength of the fused region weakens. Therefore, the reliability with respect to fracture is not satisfactory. Further, if the fused region increases in length, the overall size of the optical coupler also increases. In addition, if the fused region is long, a correspondingly long time is required for fusing and pulling the optical fibers, resulting in an increase in the time needed for the production of the optical coupler.

SUMMARY OF THE INVENTION

Accordingly, it is an object of the present invention to provide an optical coupler which enables realization of reduced wavelength dependence by an easy method which needs no additional process even if ordinary optical fibers of equal propagation constant are used.

It is another object of the present invention to provide an optical coupler which enables a reduction in the length of the fused region to thereby enhance the strength thereof.

The present invention provides an optical coupler having a tapered fused region produced by locally heating the periphery of a plurality of aligned optical fibers, each having a core and a cladding, so that the optical fibers fuse together at the heated part, and then drawing the resulting fused region by pulling. The length of the fused region is not longer than 10 mm.

By specifying the length of the fused region to be not longer than 10 mm, the wavelength dependence of the coupling ratio can be reduced. More specifically, it is possible to realize coupling of reduced wavelength dependence simply by carrying out the ordinary fusing and pulling process using ordinary optical fibers of equal propagation constant without employing a special process or special optical fibers. In addition, since the pulling distance shortens, the fused region becomes short in length, and the smallest-diameter portion increases in diameter. Accordingly, the strength of the fused region is enhanced, and the reliability is improved. It is also possible to realize a reduction in the overall size of the optical coupler.

It is preferable that the configuration of the tapered fused region should be made approximately the same as the configuration drawn by the coordinates (X, Y) of the equation (1) defined as follows:

$$Y = \pm \{a - b \cdot \exp(-X^2/c^2)\} \quad (1)$$

where

X: an axis X parallel to the optical axis in a coordinate system (X, Y) with the central point of the fused region as the origin;

Y: an axis Y perpendicular to the optical axis in the coordinate system (X, Y) with the central point of the fused region as the origin;

a: the value on the Y-axis of the largest-diameter portion at each end of the fused region;

b: a difference between the value on the Y-axis of the largest-diameter portion of the fused region and the value on the Y-axis of the smallest-diameter portion in the center of the fused region;

c: the length of ¼ of the overall length of the fused region.

The fused region may also be provided in such a manner that a plurality of optical fibers are disposed to intersect each other at a predetermined angle, and the intersecting portions are locally heated so as to fuse together and then subjected to pulling.

If the tapered fused region is provided at each of two or more positions on the optical fibers, it is possible to further reduce the wavelength dependence of the optical coupler.

In addition, the present invention provides an optical coupler having a tapered fused region produced by locally heating the periphery of a plurality of aligned optical fibers, each having a core and a cladding, so that the optical fibers fuse together at the heated part, and then drawing the resulting fused region by pulling. The part of at least one of the optical fibers which is to be subjected to fusing and pulling has previously been heat-treated at a high temperature so that the core thereof is enlarged. If the part of an optical fiber which has the core enlarged in advance is subjected to fusing and pulling, coupling begins earlier, and the pulling distance required to attain the necessary coupling ratio shortens. Accordingly, the optical coupler can be produced in a shortened period of time. Thus, the operating efficiency improves, and it is also possible to reduce the overall size of the optical coupler. In addition, the diameter of the smallest-diameter portion of the fused region can be increased. Accordingly, the mechanical strength can be enhanced.

If the length of the fused region is reduced to 10 mm or less, the wavelength dependence of the coupling ratio can be minimized.

DESCRIPTION OF THE PREFERRED EMBODIMENTS

Embodiments of the present invention will be described below in detail with reference to the accompanying drawings.

Figure 1:
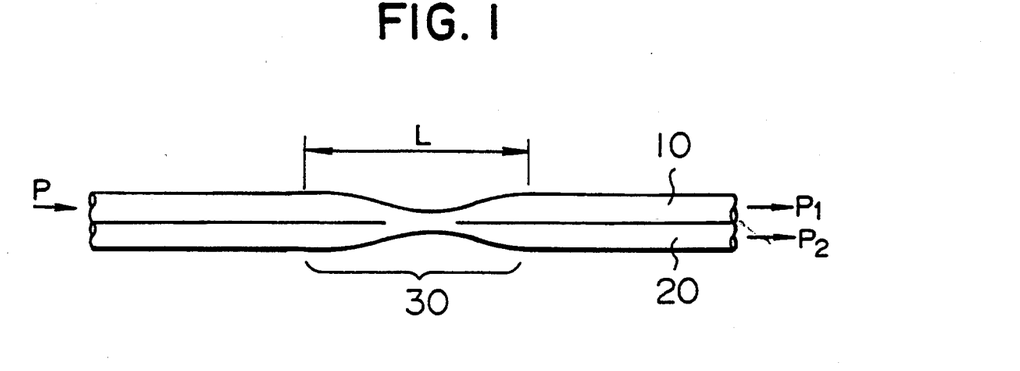
FIG. 1 shows the general structure of an optical coupler according to one embodiment of the present invention.

FIG. 1 shows the general structure of an optical coupler according to one embodiment of the first invention of the present application. As shown in the figure, the optical coupler according to this embodiment has a tapered fused region 30 which is formed by locally heating the periphery of two aligned optical fibers 10 and 20 made of glass, each having a core and a cladding with the coating peeled therefrom, so that the two optical fibers 10 and 20 fuse together at the heated part, and then drawing the fused region by pulling. The length L of the fused region 30 is specified to be not longer than 10 mm. In other words, the present invention achieves a reduction in the wavelength dependence by making the length L of the fused region 30 shorter than that in the conventional optical coupler. In addition, the present invention provides various ideas to shorten the length L of the fused region 30.

Figure 2A:
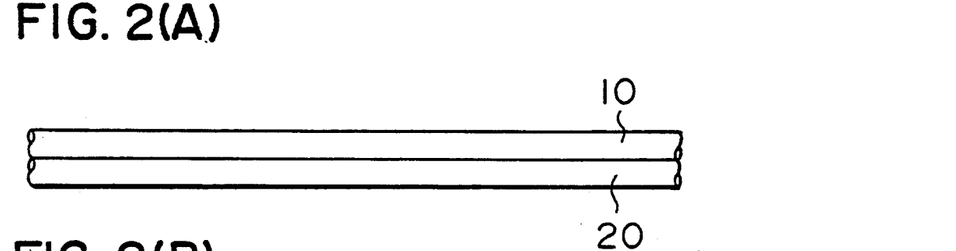
FIGS. 2(A), 2(B) and 2(C) illustrate a method of producing the optical coupler shown in FIG. 1.
Figure 2B:
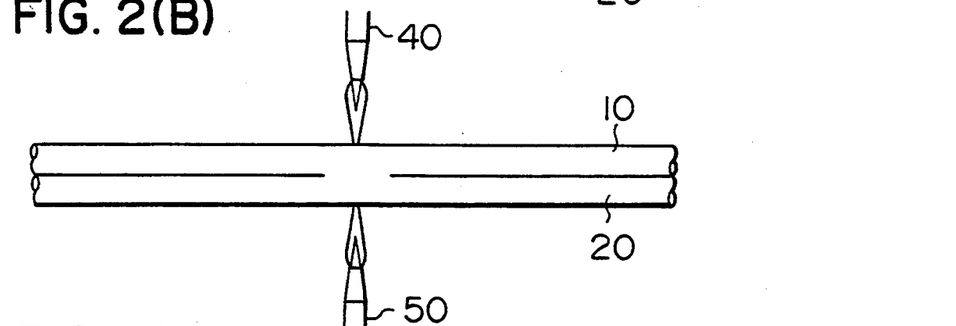
Figure 2C:
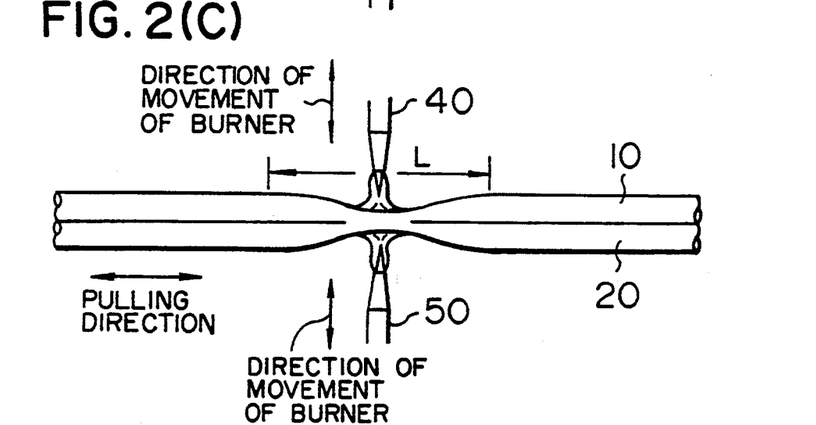

FIG. 2 illustrates a method of producing the above-described optical coupler. That is, first, as shown in FIG. 2(A), two ordinary single-mode optical fibers 10 and 20 of equal propagation constant (the strand having the coating peeled therefrom so that the cladding is exposed) are held in alignment with each other. It should be noted that the outer diameter of the cladding of each optical fiber used is 125 μm, which is an ordinary diameter size.

Next, as shown in FIG. 2(B), gas burners 40 and 50 are brought close to the aligned optical fibers 10 and 20 from both lateral sides thereof, and the ends of the flames of the burners 40 and 50 are applied to the optical fibers 10 and 20, thereby locally fusing them together.

After the two optical fibers 10 and 20 have fused together, the flames of the gas burners 40 and 50 are brought closer to the optical fibers 10 and 20 than in the fusing process, as shown in FIG. 2(C), and in this state, the optical fibers 10 and 20 are pulled. The pulling operation is stopped when a necessary coupling ratio is obtained. However, the length L of the fused region 30 must be within 10 mm in order to reduce the wavelength dependence of the optical coupler.

During the above-described fusing and pulling process, the gas burners 40 and 50, which serve as a heat source, are not moved sidewardly (i.e., the directions in which the optical fibers are pulled). Thus, it is possible to minimize the spread of the flames and hence possible to obtain a steeply tapered fused region 30 and to shorten the length L thereof.

Figure 3:
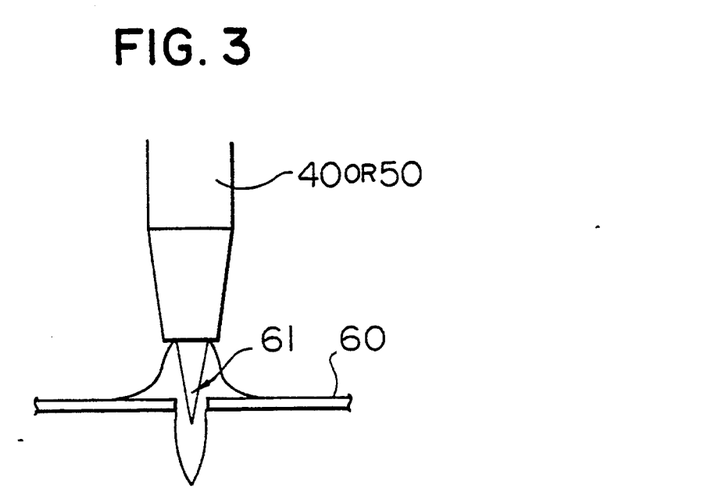
FIG. 3 illustrates a method of using gas burners 40 and 50.

Further, a smaller diameter of the flames enables the fused region 30 to be tapered even more steeply. According to the experiment carried out by the inventor of the present application, it was necessary in order to make the length of the fused region 30 not longer than 10 mm to set the nozzle diameter of the gas burners 40 and 50 to be not larger than 0.3 mm. To obtain a small flame diameter equal to the above, the diameter of the flame of each of the gas burners 40 and 50 may be reduced by installing an aperture pinhole plate 60 having a pinhole 61 in the flame of the gas burner, as shown in FIG. 3. Further, oxygen is added to the gas used in order to attain a high temperature.

Figure 4:
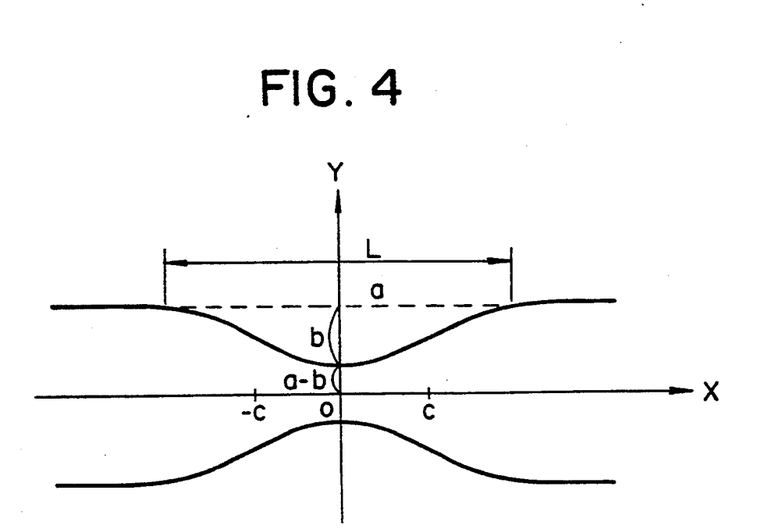
FIG. 4 shows a model of the external configuration of a fused region 30 according to the present invention.
Figure 4A:
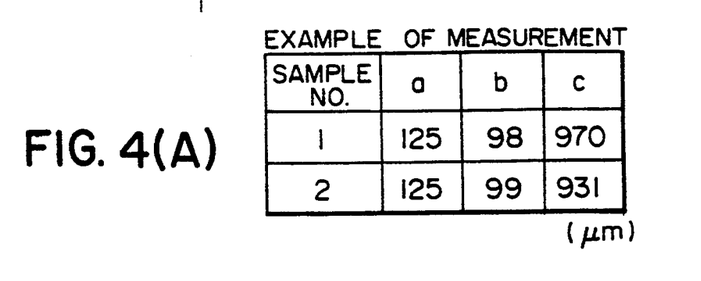

FIG. 4 shows a model of the external configuration of the tapered fused region 30 according to the present invention. The external configuration of the optical coupler according to the present invention may approximately be expressed by $$Y = \pm \{a - b \cdot exp(-X^2/c^2)\} \qquad (1)$$

where

X: an axis X parallel to the optical axis in a coordinate system (X, Y) with the central point 0 of the fused region as the origin;

Y: an axis Y perpendicular to the optical axis in the coordinate system (X, Y) with the central point 0 of the fused region as the origin;

a: the value on the Y-axis of the largest-diameter portion at each end of the fused region;

b: a difference between the value on the Y-axis of the largest-diameter portion of the fused region and the value on the Y-axis of the smallest-diameter portion of the fused region;

c: the length of ¼ of the overall length L of the fused region.

In this case, the length L of the fused region 30 is expressed by $L = 4c$. The diameter of the smallest-diameter portion is expressed by $2(a-b)$.

Figure 5:
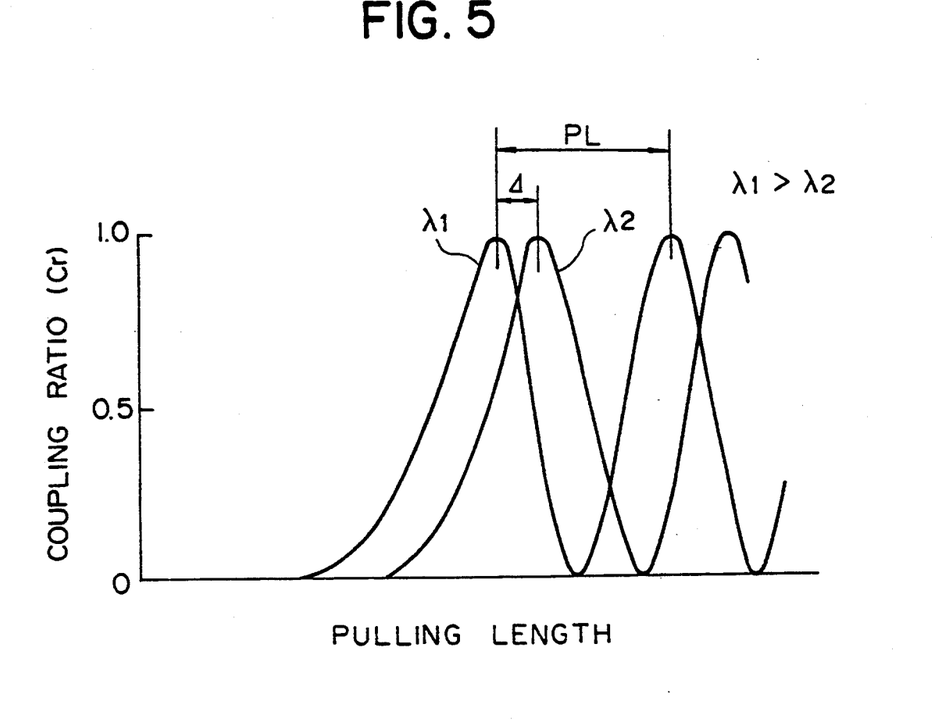
FIG. 5 is a graph showing pulling length-coupling ratio characteristics of the optical coupler.

In general, the external configuration of the optical coupler can be expressed in the above form. The pulling length-coupling ratio characteristics in this case are such as those shown in FIG. 5. Assuming that there are two wavelengths $\lambda_1$ and $\lambda_2$ ($\lambda_1 > \lambda_2$), coupling starts with the longer wavelength $\lambda_1$. In the figure, if the pulling length difference between the wavelengths $\lambda_1$ and $\lambda_2$ for the same coupling ratio is $\Delta$, the shorter the coupling length, that is, the shorter the length L, the smaller the value of $\Delta$. That is, $\Delta$ becomes closer to zero. Accordingly, as L is shortened, coupling ratio characteristics of $\lambda_1$ and $\lambda_2$ approach each other and eventually become approximately equal to each other. Further, the coupling period PL shortens as the process of pulling progresses. The coupling period PL also shortens as the value of $\Delta$ decreases. In such a case, the wavelength characteristics gradually flatten. That is, the wavelength dependence can be minimized.

Figure 6:
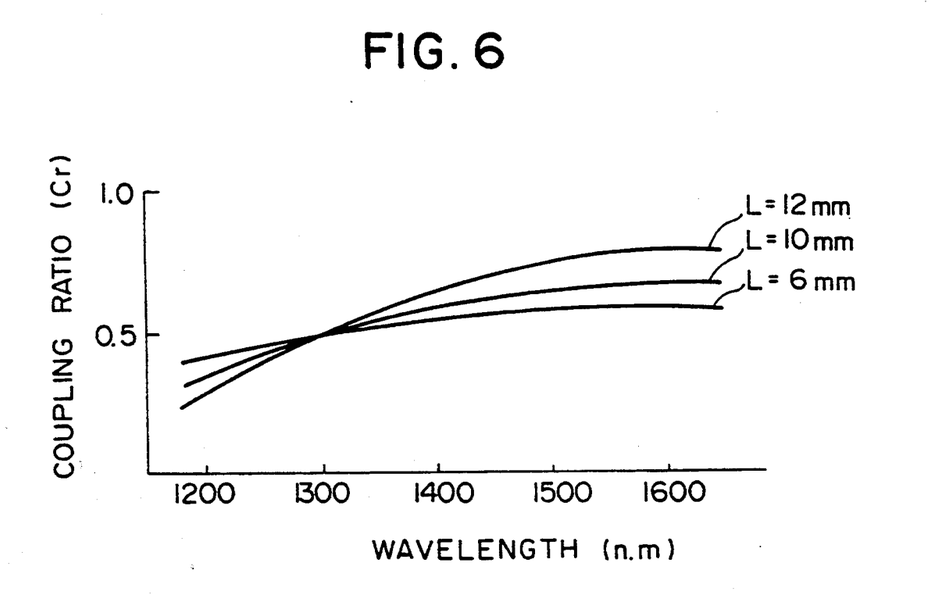
FIG. 6 is a graph showing the relationship between wavelength-coupling ratio characteristics and the length L of the fused region 30.

This is shown in FIG. 6. FIG. 6 is a graph showing the relationship between wavelength-coupling ratio characteristics and the length L of the fused region 30. It will be understood from the graph that the shorter the length L, the flatter the wavelength-coupling ratio characteristics, and that when the length L is not longer than 10 mm, it is possible to minimize the wavelength dependence particularly effectively.

Such characteristics may be explained by mode coupling between equal cylindrical waveguides. According to the mode coupling, the coupling ratio $Cr [Cr = P_2/(P_1 + P_2)$ in FIG. 1] is expressed by $$Cr = \eta \sin^2(\xi z) \qquad (2)$$

where $\eta$: coupled power rate
$\xi$: propagation constant
$z$: coupling length In coupling where the length of the fused region is short as in the present invention, the core diameter in the coupling part is small, so that a relatively large quantity of light leaks from the core. Accordingly, coupling of light propagating is enhanced, and hence the propagation constant $\xi$ increases. Therefore, as the process of pulling progresses, that is, as the coupling length z increases, the coupling period PL shortens. If the core diameter or the core spacing is small, the wavelength dependence of the propagation constant is small. In this case, therefore, since the core diameter is small, the wavelength dependence of the propagation constant is small. Accordingly, different wavelengths show approximately the same coupling characteristics. Thus, the value of $\Delta$ becomes minimal.

With regard to the relationship between the coupling length z and the wavelength-coupling ratio characteristics, if the coupling length z reduces to half, the value of $\xi z$ becomes half, and the period of the wavelength-coupling ratio characteristics doubles. That is, in between waveguides having certain coupling, as the coupling length z shortens, the period of the wavelength-coupling ratio characteristics increases. Thus, the wavelength dependence is reduced. In other words, in an optical fiber fusing and pulling type coupler, the wavelength dependence is reduced by shortening the length L of the fused region 30 as in the present invention.

Although in the above-described embodiment only an example of fusing and pulling two optical fibers has been shown, it should be noted that the present invention is not necessarily limited to the described embodiment and that three or more optical fibers may be subjected to the fusing and pulling process according to the present invention.

Although in the foregoing embodiment two gas burners are employed as a heat source, a single gas burner may be used instead. If necessary, three or more gas burners may be used.

Figure 7A:
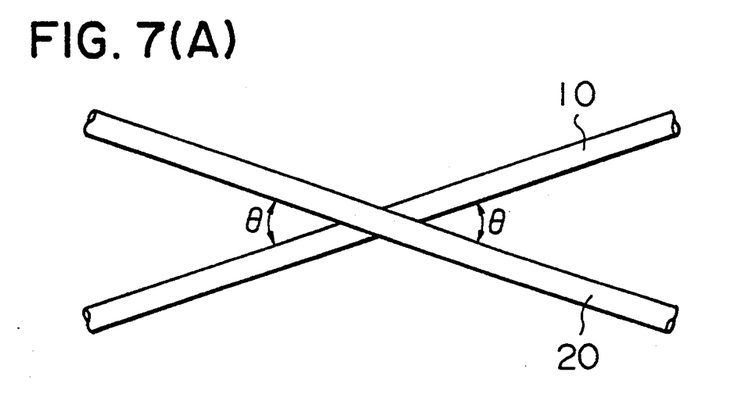
FIG. 7(A), 7(B) and 7(C) illustrate a method of producing an optical coupler according to another embodiment of the present invention.
Figure 7B:
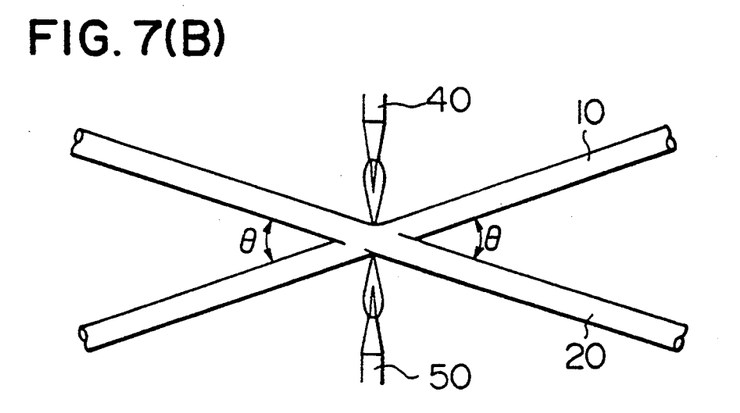
Figure 7C:
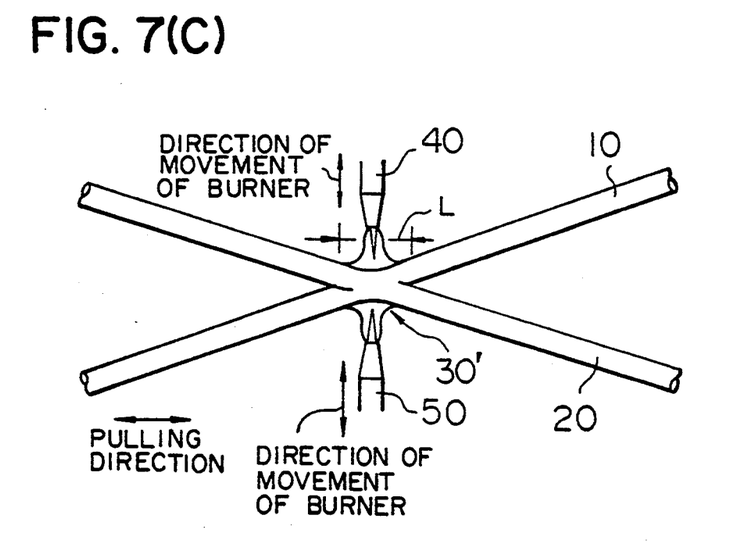

FIG. 7 illustrates a method of producing an optical coupler according to another embodiment of the present invention. The second embodiment differs from the first embodiment, shown in FIGS. 1 and 2, in that a plurality of optical fibers which are to be fused together are disposed to intersect each other, and the intersecting portions are locally heated so as to fuse together and then subjected to pulling, thereby providing a tapered fused region.

More specifically, first, as shown in FIG. 7(A), two optical fibers 10 and 20 are brought into contact with each other so as to intersect at a predetermined angle $\Theta$ ($0 < \Theta \leq 90°$).

Next, gas burners 40 and 50 are brought close to the contacting portions in the same way as in the first embodiment, and the ends of the flames of the gas burners 40 and 50 are applied to the contacting portions, thereby locally heating and fusing them together.

Then, as shown in FIG. 7(C), the flames of the gas burners 40 and 50 are brought closer to the resulting fused region 30' than in the fusing process, and in this state the optical fibers 10 and 20 are pulled until a necessary coupling ratio is attained. It should be noted that the length L of the fused region 30' is not longer than 10 mm.

Thus, in this embodiment the optical fibers 10 and 20 are disposed to intersect each other, and the intersection is fused and then subjected to pulling. Consequently, the area of contact between the optical fibers 10 and 20 is smaller than in the case of the first embodiment. Accordingly, it is possible to shorten the fusing region and hence the length L of the tapered fused region 30' more than in the first embodiment. Thus, the optical coupler of this embodiment is more suitable for reducing the wavelength dependence.

Figure 8:
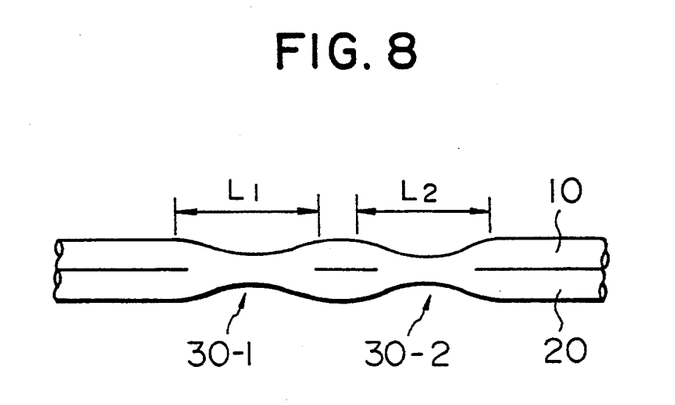
FIG. 8 shows an optical coupler according to still another embodiment of the present invention.

FIG. 8 shows an optical coupler according to still another embodiment of the present invention. As illustrated in the figure, in this embodiment two tapered fused regions 30-1 and 30-2 are provided at two positions, respectively, on two aligned optical fibers 10 and 20, and the lengths $L_1$ and $L_2$ of the two fused regions 30-1 and 3-2 are each specified to be not longer than 10 mm. With this arrangement, the overall wavelength dependence of the coupling ratio can be minimized more than in the case of a single fused region.

Figure 9:
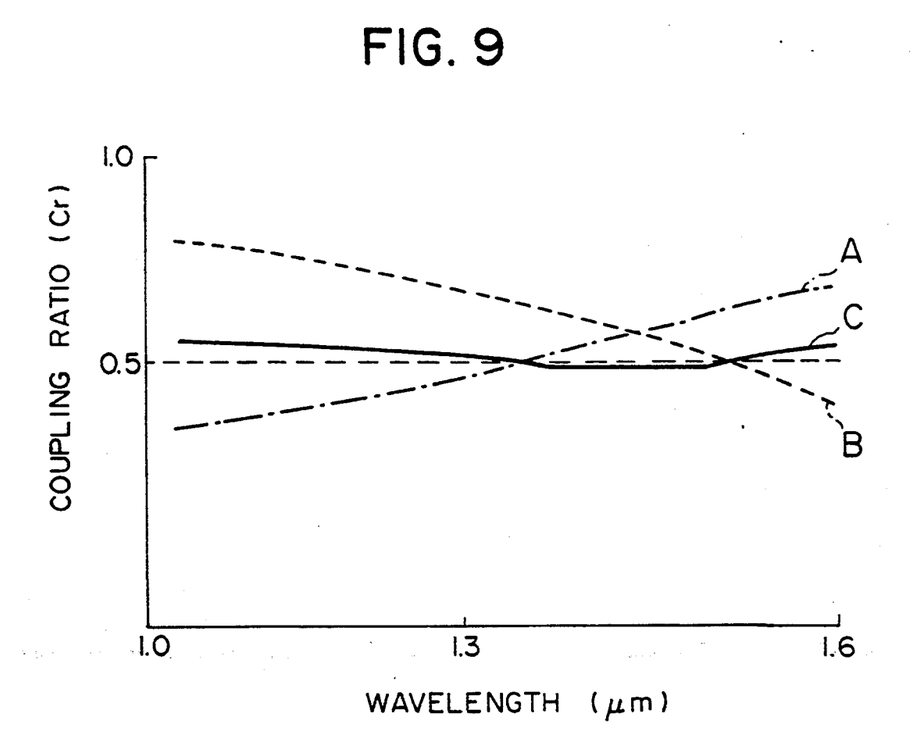
FIG. 9 is a graph showing wavelength-coupling ratio characteristics of the optical coupler shown in FIG. 8.

FIG. 9 is a graph showing the wavelength-coupling ratio characteristics of the optical coupler shown in FIG. 8. In the graph, the curve A shows the wavelength-coupling ratio characteristics at the one fused region 30-1, while the curve B shows the wavelength-coupling ratio characteristics at the other fused region 30-2, and the curve C shows the overall wavelength-coupling ratio characteristics of this optical coupler. As is shown in the figure, if the coupling ratio obtained by either the fused region 30-1 or 30-2 is 0.5, the overall coupling ratio of the optical coupler is also 0.5. On other occasions, the overall coupling ratio of the optical coupler is determined by the coupling ratios of the two fused regions 30-1 and 30-2.

Assuming that the coupling ratio of the one fused region is $Cr_1$ and the coupling ratio of the other fused region is $Cr_2$, the overall coupling ratio Cr is given by $$Cr = Cr_1 + Cr_2 - 2 \cdot Cr_1 \cdot Cr_2$$

Since the lengths $L_1$ and $L_2$ of the two fused regions 30-1 and 30-2 are specified to be not longer than 10 mm according to the present invention, either of the fused regions 30-1 and 30-2 singly shows flat wavelength-coupling ratio characteristics. Therefore, the optical coupler exhibits flatter wavelength-coupling ratio characteristics as a whole. That is, as shown in FIG. 9, the coupling ratio can readily be flattened even in a wide wavelength band ranging from 1.0 $\mu$m to 1.6 $\mu$m. Accordingly, extremely flat, excellent characteristics can be obtained at wavelengths in the range of 1.3 $\mu$m to 1.55 $\mu$m, which are intermediate wavelengths in the wavelength band and which are also working wavelengths.

Incidentally, there has also been a conventional optical coupler in which fused regions are provided at two positions, respectively, on two aligned optical fibers to reduce the wavelength dependence of the coupling ratio. However, the conventional optical coupler employs conventional fused regions each having a relatively long tapered portion and is therefore incapable of satisfactorily flattening the wavelength-coupling ratio characteristics of each fused region. Accordingly, the overall wavelength-coupling ratio characteristics of the optical coupler fluctuate considerably when measured over a wide wavelength band.

Therefore, with the conventional technique, if the overall coupling ratio of the optical coupler is to be set, for example, at 0.5 around working wavelengths 1.3 $\mu$m and 1.55 $\mu$m, the optical coupler must be produced so that the coupling ratio obtained by the one fused region is strictly 0.5 at the one working wavelength 1.3 $\mu$m, while the coupling ratio obtained by the other fused region is strictly 0.5 at the other working wavelength 1.55 $\mu$m. Further, it is difficult to stably maintain similar coupling ratios in the other wavelength bands.

In contrast to the above, the optical coupler of this embodiment enables the coupling ratio to be readily made flat at 0.5 at the working wavelength associated with each fused region without the need to produce it so strictly as in the above-described conventional optical coupler because a single fused region alone exhibits fairly flat wavelength-coupling ratio characteristics. The optical coupler of this embodiment is capable of stably maintaining the coupling ratio over a wider wavelength band than the above.

Figure 10A:
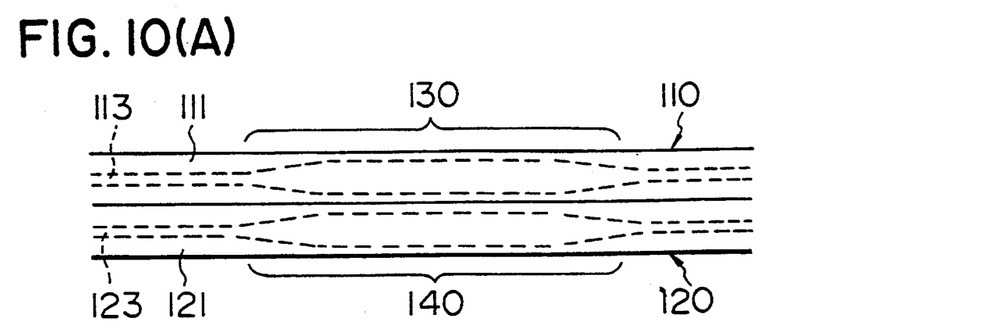
FIGS. 10(A) and 10(B) illustrate a method of producing an optical coupler according to one embodiment of the second invention of the present application.
Figure 10B:
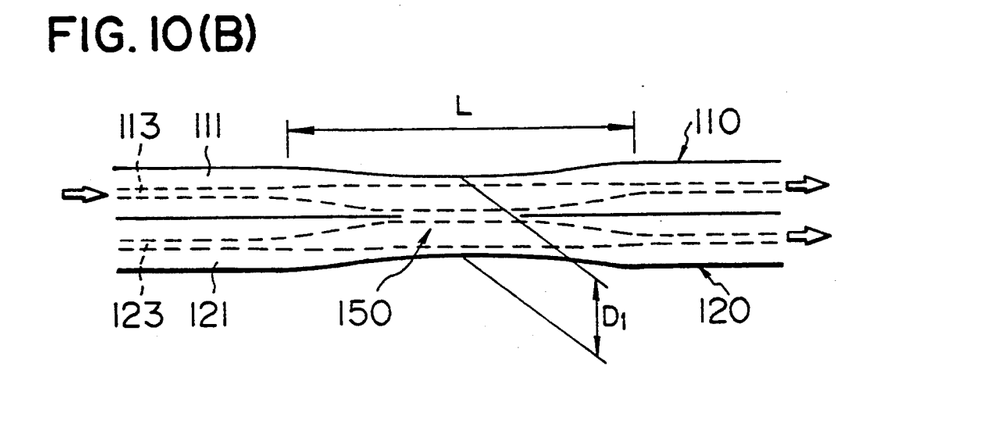

FIG. 10 illustrates a method of producing an optical coupler according to one embodiment of the second invention of the present application. To produce this optical coupler, first, as shown in FIG. 10(A), two optical fibers (single-mode optical fibers) 110 and 120 of equal structure having enlarged-core portions 130 and 140 are aligned and held by using gripping means (not shown).

To provide the optical fiber 110 (120) with an enlarged-core portion 130 (140), a predetermined portion of the optical fiber 110 (120) is heated for a certain period of time at 1,000° C. to 1,500° C. by using a gas burner or an electric heater. Thus, a dopant (e.g., germanium Ge) in the heated portion, which has been added to the core 113 (123) to attain a high refractive index, is diffused in the cladding 111 (121), so that the high-refractive index portion spreads in the cladding 111 (121). As a result, the optical waveguide widens, and the mode field diameter enlarges, which is equivalent to enlargement of the core 113 (123). Thus, it is possible to enlarge the mode field diameter by about 2 to 5 times while maintaining the single mode of ordinary single-mode optical fibers.

Next, as shown in FIG. 10(B), the enlarged-core portions 130 and 140 of the two optical fibers 110 and 120 are fused together by heating and then subjected to pulling until a predetermined coupling ratio is attained. Thus, a fused region 150 is formed, and the optical coupler of this embodiment is completed.

In this case, the mode field diameters of the enlarged-core portions 130 and 140 are larger than those of the other, normal core portions 113 and 123, and the mode field of light propagating in the fused region 150 is enlarged by slight pulling. Therefore, coupling between the adjacent cores 113 and 123 starts at a correspondingly earlier stage, and light shifts. In other words, the pulling length needed to couple the two optical fibers 110 and 120 is shorter than in the case of the conventional optical coupler.

On the other hand, if it is necessary to match working wavelengths with each other in 0 and 1 peak of the coupling ratio as in the case of a wavelength-division multiplexer/demultiplexer, for example, the fused region must be drawn longer by an amount corresponding to the required power transfer cycles (pulling-coupling period PL). In this embodiment, however, the startup of coupling is quick as described above, and therefore the pulling operation can be completed in a correspondingly short time.

Accordingly, the length L of the fused region 150 of the optical coupler according to this embodiment, shown in FIG. 10(B), is shorter than the length of the fused region of the conventional optical coupler, and the smallest diameter $D_1$ is larger than that of the fused region of the conventional optical coupler. In other words, the optical coupler of this embodiment has an increased diameter. Therefore, the strength of the optical coupler is enhanced.

Figure 11:
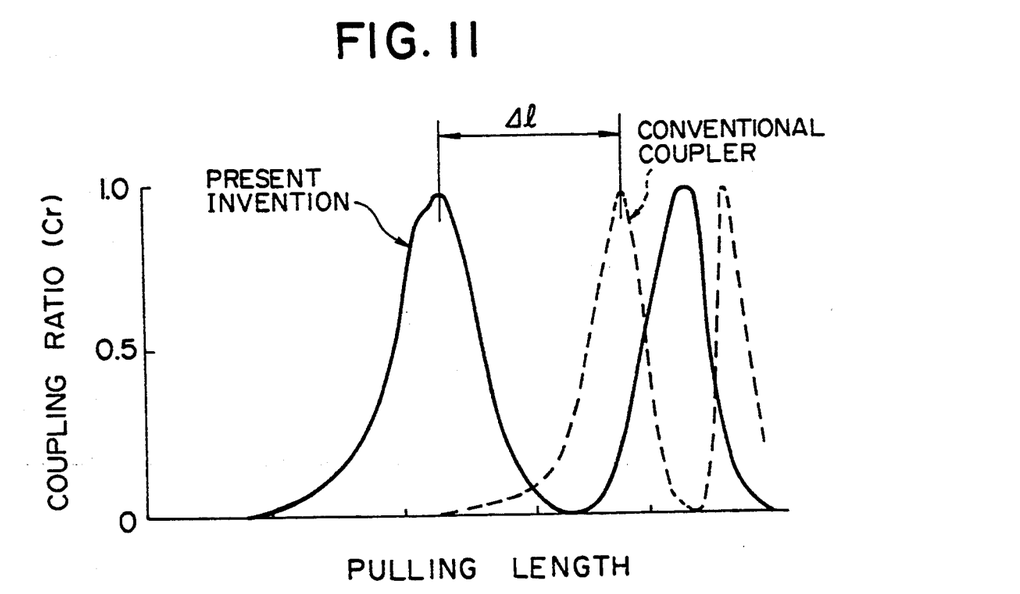
FIG. 11 is a graph comparatively showing pulling length-coupling ratio characteristics of the optical coupler according to the embodiment shown in FIG. 10 and those of a conventional optical coupler.

FIG. 11 is a graph comparatively showing the pulling length-coupling ratio characteristics of the optical coupler of the above-described embodiment and those of the conventional optical coupler. It will be understood from the graph that coupling is initiated earlier in the optical coupler of the present invention than in the conventional optical coupler.

Figure 12:
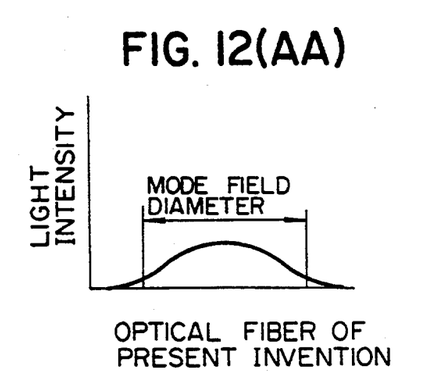
FIGS. 12(A) and 12(B) are graphs respectively showing for comparative purposes the mode field diameter of enlarged-core portions 130 and 140 of optical fibers 110 and 120 shown in FIG. 10 and the mode field diameter of ordinary optical fibers.
Figure 12A:
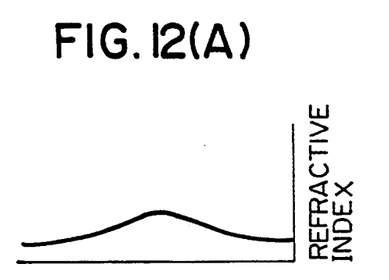
Figure 12B:
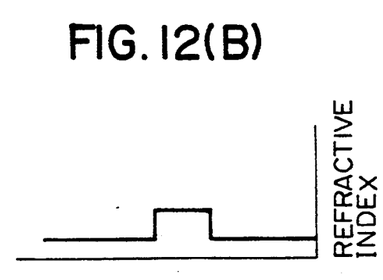

FIGS. 12(A) and 12(B) are graphs respectively showing for comparative purposes the mode field diameter of the enlarged-core portions 130 and 140 of the optical fibers 110 and 120, shown in FIG. 10, and the mode field diameter of ordinary optical fibers. It will be understood that the two different kinds of optical fiber are different in the mode field diameter but equivalent to each other in terms of light intensity.

Incidentally, to reduce the wavelength dependence of this optical coupler, which has been enhanced in strength by the above-described arrangement, the first invention should be applied to this embodiment.

That is, to reduce the wavelength dependence of the optical coupler according to this embodiment, the length L of the fused region 150 of the optical coupler, shown in FIG. 10(B), is reduced to 10 mm or less so that the taper angle becomes relatively large. The method of producing the optical coupler is the same as that explained in connection with FIG. 2.

With the above-described arrangement, not only the strength of the optical coupler is enhanced, but also the wavelength dependence of the optical coupler can be reduced.

Although in the foregoing embodiment two optical fibers are coupled together, it should be noted that the present invention is not necessarily limited thereto and that three or more optical fibers may be coupled together.

It is also possible to provide an enlarged-core portion in only one of the optical fibers to be coupled together. Further, enlarged-core portions provided in optical fibers to be coupled may have different core diameters. In these cases, since the propagation constants of light propagating are different from each other, incomplete coupling occurs. Accordingly, it is possible to reduce the wavelength dependence.

The present invention may be carried out in various other forms without departing from the spirit and principal features thereof. Accordingly, the foregoing embodiments are merely illustrative examples in all respects and should not limitatively be construed. The scope of the present invention is limited solely by the appended claims and by no means bound by the text of the specification. Further, it should be noted that all modifications and changes that belong to equivalents of the appended claims fall within the scope of the present invention.

What we claim is:

1. An optical coupler having a tapered fused region produced by locally heating the periphery of a plurality of aligned optical fibers, each having a core and a cladding, so that said optical fibers fuse together at the heated part, and then drawing the resulting fused region by pulling, wherein the length of said fused region is not longer than 10 mm, wherein said tapered fused region has a configuration approximately defined by $$Y = \pm \{a - b \cdot \exp(-X^2/c^2)\} \quad (1)$$

where
- X: an axis X parallel to an optical axis in a coordinate system (X, Y) with a central point of said fused region as an origin;
- Y: an axis Y perpendicular to the optical axis in the coordinate system (X, Y) with the central point of said fused region as an origin;
- a: a value on the Y-axis of the largest-diameter portion at each end of said fused region;
- b: a difference between the value on the Y-axis of the largest-diameter portion of said fused region and a value on the Y-axis of the smallest-diameter portion of said fused region;
- c: the length of ¼ of the overall length of said fused region.

2. An optical coupler according to claim 1, wherein said tapered fused region is provided in such a manner that a plurality of optical fibers are disposed to intersect each other at a predetermined angle, and the intersecting portions are locally heated so as to fuse together and then subjected to pulling.

3. An optical coupler according to claim 1, wherein said tapered fused region is provided at each of two or more positions.

4. An optical coupler having a tapered fused region produced by locally heating the periphery of a plurality of aligned optical fibers, each having a core and a cladding, so that said optical fibers fuse together at the heated part, and then drawing the resulting fused region by pulling, wherein the part of at least one of said optical fibers which is to be subjected to fusing and pulling has previously been heat-treated at a high temperature so that the core thereof is enlarged, wherein said tapered fused region has a configuration approximately defined by $$Y = \pm \{a - b \cdot \exp(-X^2/c^2)\} \quad (1)$$

where
- X: an axis X parallel to an optical axis in a coordinate system (X, Y) with a central point of said fused region as an origin;
- Y: an axis Y perpendicular to the optical axis in the coordinate system (X, Y) with the central point of said fused region as an origin;
- a: a value on the Y-axis of the largest-diameter portion at each end of said fused region;
- b: a difference between the value on the Y-axis of the largest-diameter portion of said fused region and a value on the Y-axis of the smallest-diameter portion of said fused region;
- c: the length of ¼ of the overall length of said fused region.

5. An optical coupling according to claim 4, wherein the length of said tapered fused region is not longer than 10 mm.

* * * * *

UNITED STATES PATENT AND TRADEMARK OFFICE
CERTIFICATE OF CORRECTION

PATENT NO. : 5,410,626
DATED : APRIL 25, 1995
INVENTOR(S) : MICHITAKA OKUTA ET AL.

It is certified that error appears in the above-indentified patent and that said Letters Patent is hereby corrected as shown below:

Column 10, lines 9-11:

Correct the numerical expression (1) in Claim 1 so that it will be on one line as shown below:

$$Y = \pm \{a - b \cdot \exp(-X^2/c^2)\} \qquad (1)$$

Signed and Sealed this

Twenty-fourth Day of October, 1995

Attest:

BRUCE LEHMAN

Attesting Officer

Commissioner of Patents and Trademarks